United States Patent
Fu et al.

[11] Patent Number: 5,521,475
[45] Date of Patent: May 28, 1996

[54] ELECTRIC POWER STEERING APPARATUS

[75] Inventors: Jian-Guo Fu, Yamatokooriyama; Hirofumi Matsuoka, Kyoto, both of Japan

[73] Assignee: Koyo Seiko Co., Ltd., Osaka, Japan

[21] Appl. No.: 157,221

[22] Filed: Nov. 23, 1993

[30] Foreign Application Priority Data

Nov. 25, 1992 [JP] Japan ................................. 4-339857
Feb. 17, 1993 [JP] Japan ................................. 5-053103

[51] Int. Cl.$^6$ .................................................. H02P 1/04
[52] U.S. Cl. .......................... 318/459; 318/432; 180/446
[58] Field of Search ................................. 318/434, 489, 318/432, 500, 371, 459; 180/79.1, 142

[56] References Cited

U.S. PATENT DOCUMENTS

| | | | |
|---|---|---|---|
| 4,756,375 | 7/1988 | Ishikura et al. | 180/79.1 |
| 4,837,692 | 6/1989 | Shimizu | 180/79.1 |
| 4,977,507 | 12/1990 | Matsuoka et al. | 180/142 |
| 5,253,725 | 10/1993 | Nishimoto | 180/79.1 |
| 5,255,755 | 10/1993 | Fu | 318/371 |
| 5,367,235 | 11/1994 | Fukudome | 318/286 |

FOREIGN PATENT DOCUMENTS

| | | |
|---|---|---|
| 358111 | 3/1990 | European Pat. Off. . |
| 398238 | 11/1990 | European Pat. Off. . |
| 2608120 | 6/1988 | France . |

OTHER PUBLICATIONS

"Regelungstechnik" By Follinger Otto (Elitera–Verlag, Berlin (DE)) 2nd Edition 1978, pp. 18, 19, and 205.

Primary Examiner—John W. Cabeca
Attorney, Agent, or Firm—Darby & Darby

[57] ABSTRACT

An electric power steering apparatus in which the steering force of a steering wheel is assisted by an electric motor is disclosed. The number of revolution of the electric motor is detected, and the counter electromotive force of the electric motor is calculated on the basis of the detected number of revolution. A voltage which is to be applied to the electric motor and corresponds to the driving current instruction value determined in accordance with the steering torque is corrected on the basis of the calculated counter electromotive force. In the electric power steering apparatus, the period of the detection of the number of revolution of the electric motor is made longer than the period of the feedback control of the driving current of the electric motor, and the period of the feedback control of the driving current of the electric motor is synchronized with the period of the correction of the voltage to be applied.

11 Claims, 5 Drawing Sheets

ELECTRIC POWER STEERING APPARATUS

BACKGROUND OF THE INVENTION

1. Field of the Invention

This invention relates to an electric power steering apparatus in which the steering force of a steering wheel is assisted by an electric motor.

2. Description of the Related Art

FIG. 1 is a schematic sectional view illustrating a prior art electric power steering apparatus. In the apparatus, an upper column shaft 2A to which a steering wheel 1 is attached at the upper end is rotatably supported by a column housing 3. The lower end of the upper column shaft 2A is connected via a torsion bar 4 to the upper end of a lower column shaft 2B which is coupled through a pinion 5a to a rack 5 of the steering gear. A torque sensor 6 which detects a torque acting on the upper column shaft 2A is disposed at the middle portion of the torsion bar 4. A three-phase brushless direct drive electric motor DM is disposed at the upper portion of the lower column shaft 2B. The electric motor DM including a rotor 7 fixed to the lower column shaft 2B, and a stator 8 surrounding the rotor 7. The stator 8 is fixed to the inside of a motor case 9 which is attached to the column housing 3. The output of the torque sensor 6 is derived through a slip ring 11 which is provided in the column housing 3 above the motor case 9.

FIG. 2 is a circuit diagram illustrating a conduction control circuit for the electric motor DM. A series circuit of power MOSFETs (hereinafter, referred to as "power transistors") T1 and T4 is connected between a DC power source +V and the ground. To this series circuit, two series circuits respectively consisting of power transistors T2 and T5 and power transistors T3 and T6 are connected in parallel. The junction point A of the power transistors T1 and T4 is coupled to one end of the U-phase coil 8au of a coil 8a of the electric motor DM, the junction point B of the power transistors T2 and T5 to one end of the V-phase coil 8av of the coil 8a, and the junction point C of the power transistors T3 and T6 to one end of the W-phase coil 8aw of the coil 8a. The other ends of the coils 8au, 8av and 8aw are commonly connected to each other. PWM signals for commutation-controlling the power transistors T1–T6 are supplied from a control unit (not shown) to the gates G1–G6 of the power transistors T1–T6.

The operation of the electric power steering apparatus will be described.

When the steering wheel 1 is turned, this turning operation causes a torque to act on the upper column shaft 2A, and this torque is detected by the torque sensor 6. A torque signal corresponding to the torque which is detected by the torque sensor 6 is supplied to the control unit (not shown). In accordance with this torque signal, the control unit supplies signals for commutation-controlling the power transistors T1–T6 to the gates G1–G6, thereby commutation-controlling the power transistors T1–T6. The currents flowing through the phase coils 8au, 8av and 8aw are controlled by adjusting the conduction angles of the power transistors T1–T6, so as to control the rotating force of the electric motor DM. The rotation of the thus-driven electric motor DM causes the lower column shaft 2B to rotate, thereby assisting the steering force.

This assistance to the steering force causes the acting torque to decrease. When the torque signal of the torque sensor 6 is lowered to the dead zone, it becomes unnecessary to assist the steering force, and therefore the driving operation of the electric motor DM is stopped. In this case, even if the current supply to the phase coils 8au, 8av and 8aw of the stator 8 is shut, off, the rotor 7 continues rotations owing to the inertia. Therefore, the power transistors T1, T2 and T3 are turned off and the power transistors T4, T5 and T6 are turned on, so that the one ends of the phase coils 8au, 8av and 8aw are connected to each other or the phase coils 8au, 8av and 8aw are short-circuited as shown in FIG. 3, and the rotor 7 is braked to stop the rotation by a short circuit current caused by this short circuit.

Alternatively, the power transistors T1 and T4 (T2 and T5, and T3 and T6) may be driven complementarily at a duty ratio of 50%. Also in this case, the short-circuit braking can be conducted in the same manner as described above.

When the phase coils of the electric motor are short-circuited as described above, however, a counter electromotive force is generated in each of the phase coils during a short period of time which continues until the rotor stops, whereby a reverse rotating force acts on the rotor, with the result that a rotating force which is opposite in direction to the rotating force assisting the steering force and applied by the electric motor acts on the steering wheel. This produces disadvantages that a sense of incongruity is produced in the steering and that the return of the steering wheel 1 to a straight ahead position for the vehicle wheels can not be easily done.

When the steering wheel 1 is to be returned to the straight ahead position, the apparatus receives a returning force from the wheels of the automobile, and the steering wheel 1 applies a force opposing to the returning force, so that the direction of the current for driving the electric motor in the direction in accordance with the detected torque is opposite to that of the current of the counter electromotive force due to the rotating force applied from the wheels of the automobile to the electric motor.

In order to comply with this and also to detect a winding layer short or the like in the electric motor, currents flowing through the bridge portions of the power transistor T1 and T2, etc. are detected, and the detected currents are reflected in conduction control of the power transistor T1 and T2. In this system, however, the detection of currents for three phases requires the provision of detection resistors in bridge portions for at least two phases. This hinders the electric motor from being miniaturized and made lighter. In order to reduce the number of required resistors, a system has been proposed by the applicant (U.S. patent application Ser. No. 942,636). In this proposed system, as shown in FIG. 4, a resistor R is disposed in the DC circuit portion to detect a current flowing through this portion, and the detected current is used in a feedback control. However, the proposed system cannot naturally detect a circulating current caused by a short-circuit as described above. When the electric motor is driven by the circulating current, there arises a problem in that the steering sense is impaired.

SUMMARY OF THE INVENTION

It is a principal object of the invention to provide an electric power steering apparatus in which a counter electromotive force of an electric motor is detected from the number of revolution of the electric motor, whereby a torque generated by the counter electromotive force is compensated so that an excellent steering sense is attained even in the process of returning the steering wheel to a straight ahead position.

According to the invention, the electric power steering apparatus of the invention which detects a steering torque and drives an electric motor by applying a voltage corresponding to a driving current instruction value, thereby obtaining a steering assistance force, the driving current instruction value being determined in accordance with the detected torque has: means for detecting a number of revolution of the electric motor; means for calculating a counter electromotive force of the electric motor on the basis of the detected number of revolution of the electric motor; and means for correcting a voltage to be applied to the electric motor, on the basis of the result of the calculation. In the apparatus, the number of revolutions of the electric motor is detected, the counter electromotive force of the electric motor is calculated on the basis of the detected number of revolutions, and a voltage which is to be applied to the electric motor and corresponds to the driving current instruction value determined in accordance with the detected steering torque is corrected on the basis of the calculated counter electromotive force.

Since the voltage to be applied is corrected on the basis of the counter electromotive force which is calculated from the number of revolutions of the electric motor, a torque generated by the counter electromotive force can be compensated, and therefore the steering sense during the cases such as the process of returning the steering wheel to a desired position can be improved.

In the electric power steering apparatus, the period of the detection of the number of revolutions of the electric motor may be set to be longer than the period of the feedback control of the driving current of the electric motor. According to this configuration, even in the case where the number of revolutions of the electric motor is small, the number of revolutions can be detected accurately. Therefore, the resolution of the control of the voltage for correcting the counter electromotive force is improved, resulting in that the voltage to be applied to the electric motor can be controlled smoothly in the whole range of the number of revolutions. This can solve the problem that a sound is generated due to a sudden change in torque which is caused by stepwise changing the voltage to be applied to the electric motor.

In the electric power steering apparatus, the period of the feedback control of the driving current of the electric motor may be synchronized with the period of the correction of the voltage to be applied. According to this configuration, these two controls can be conducted together without interference.

The above and further objects and features of the invention will more fully be apparent from the following detailed description with accompanying drawings.

DESCRIPTION OF THE PREFERRED EMBODIMENTS

The invention will be described with reference to the accompanying drawings illustrating an embodiment.

Figure 1:
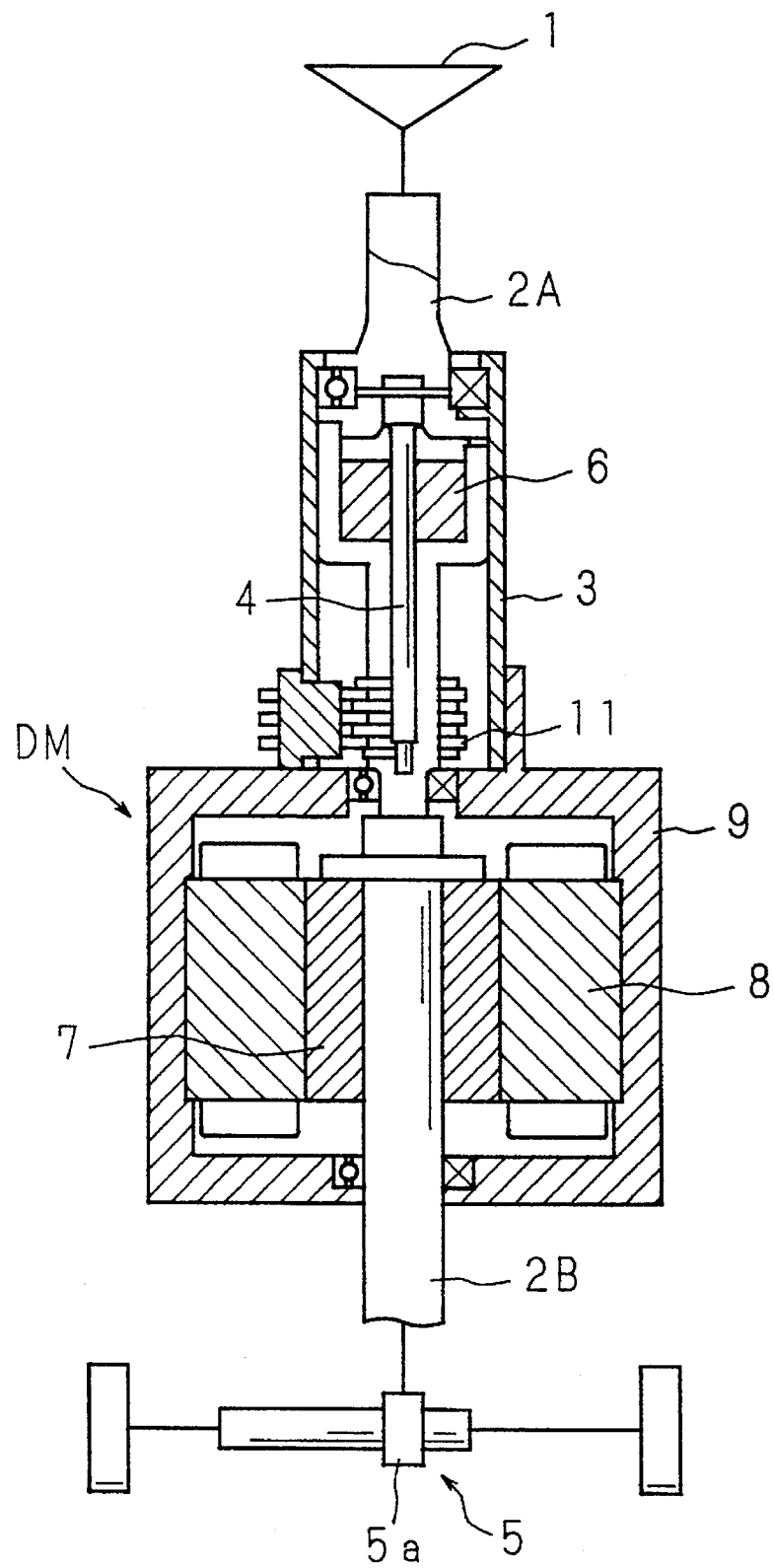
FIG. 1 is a diagram schematically showing the configuration of an electric power steering apparatus.
Figure 2:
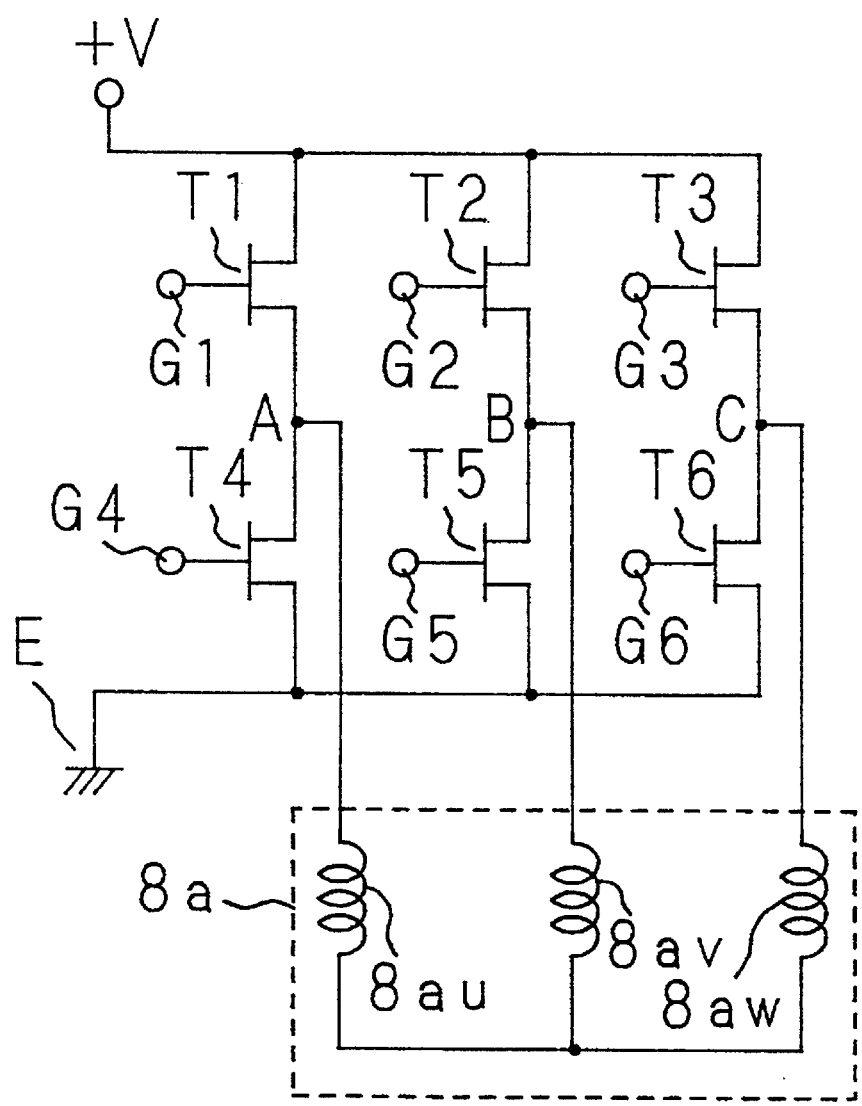
FIG. 2 is a circuit diagram of a conventional driving circuit for an electric motor.
Figure 3:
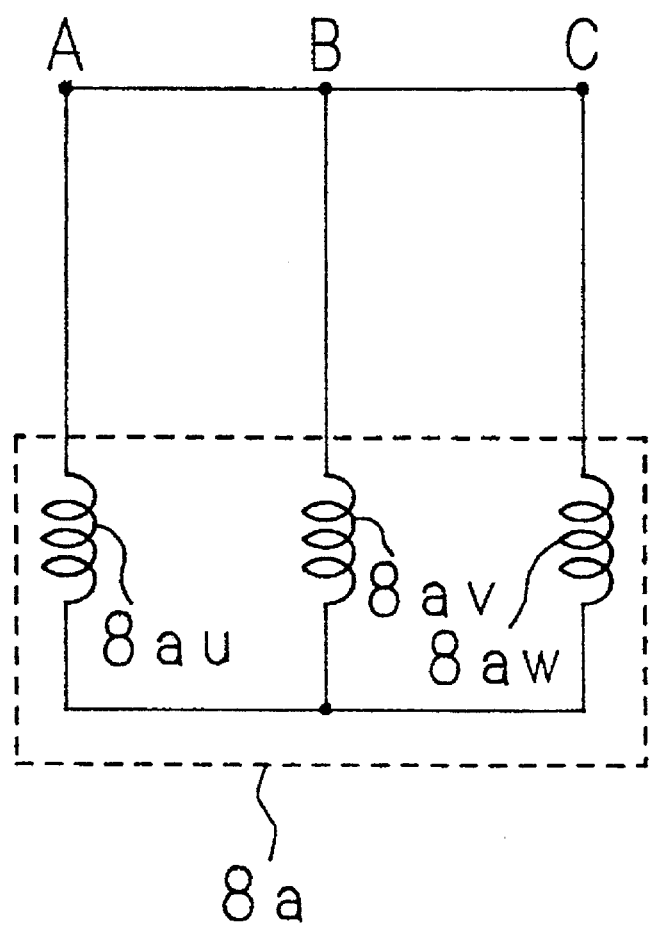
FIG. 3 is a circuit diagram of a stator of a conventional electric motor.
Figure 4:
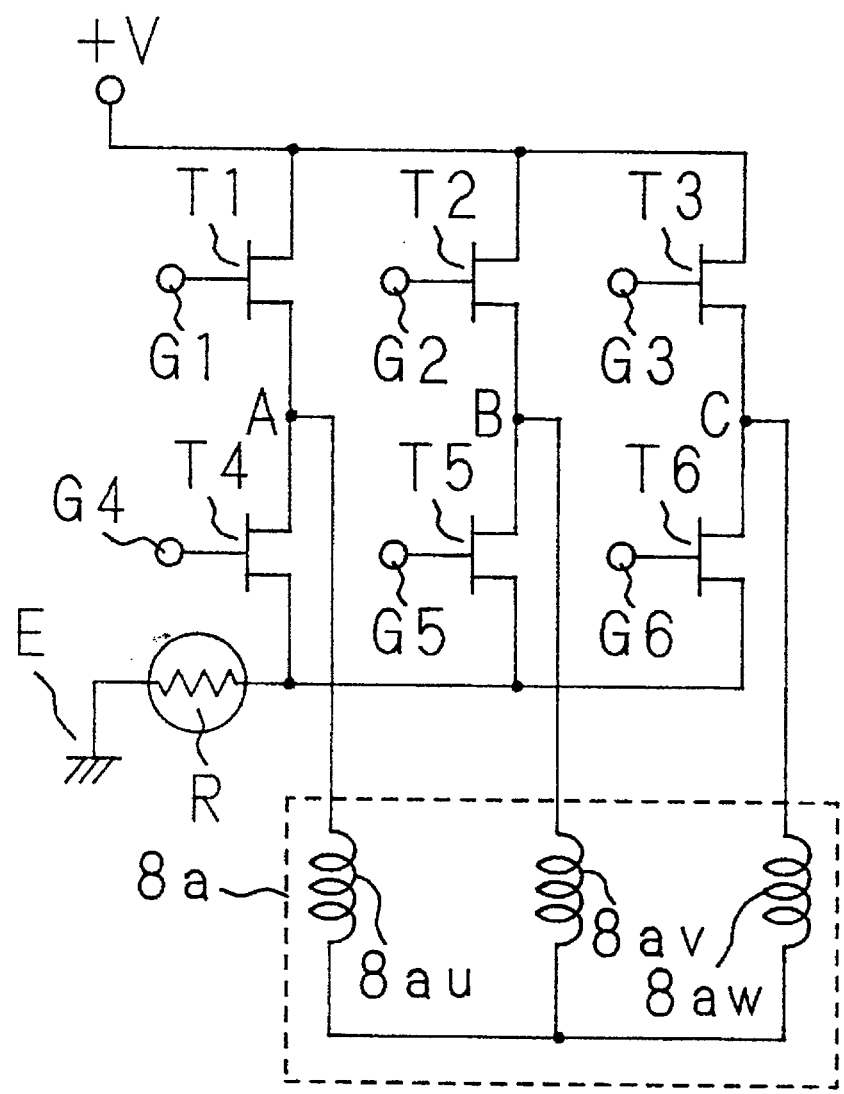
FIG. 4 is a circuit diagram of a conventional driving circuit for an electric motor.
Figure 5:
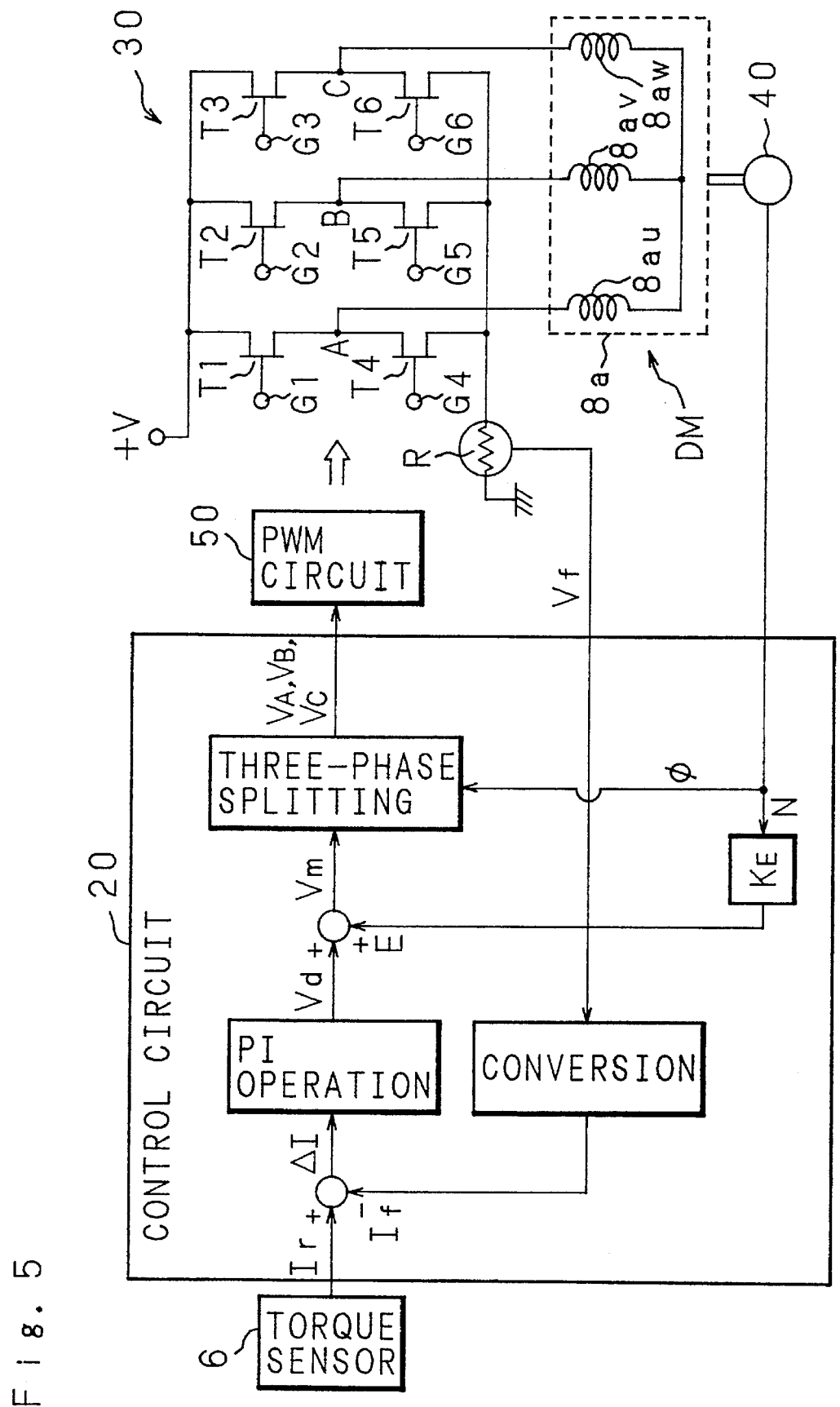
FIG. 5 is a circuit diagram of an electric power steering apparatus according to the invention.

FIG. 5 is a circuit diagram of an electric power steering apparatus according to the invention. A torque sensor 6 (see FIG. 1) detects a torque acting on a torsion bar 4 of the vehicle, and the detected torque is supplied to a current control circuit 20 which consists of a microprocessor. In the control circuit 20, the detected torque is treated as a driving current instruction value $I_r$ for an electric motor DM, and the difference $\Delta I$ between the value $I_r$ and a detection value $I_f$ of a DC current obtained through a resistor R. A resistor R is disposed in the negative side of the DC circuit portion of a driving circuit 30 for the electric motor DM. A terminal voltage $V_f$ of the resistor R is supplied to the control circuit 20 and for conversion to the feedback current $I_f$. The difference $\Delta I$ between the current instruction value $I_r$ and the feedback current $I_f$ is subjected to a PI operation to be converted into a desired voltage $V_d$ for the electric motor.

A rotary encoder 40 is coupled to the electric motor DM. The output pulse of the rotary encoder 40, which has information of the number of revolutions N and the rotation phase $\phi$ of the electric motor DM, is supplied to the control circuit 20. The control circuit 20 calculates a counter electromotive force E by using the number of revolution N and the counter electromotive force constant $K_E$ according to the following equation:

$$E = K_E \cdot N$$

Preferably, the rotary encoder 40 conducts the output for a period longer than that of the current feedback conducted in the control circuit 20. In this configuration, even when the number of revolutions of the electric motor is small, the number of revolutions can be detected accurately. Therefore, the resolution of the control of the voltage for correcting the counter electromotive force is improved, resulting in that the voltage to be applied to the electric motor can be controlled smoothly over the whole range of the number of revolutions. This can solve the problem that a sound is generated due to a sudden change in torque which is caused by stepwise changing the voltage to be applied to the electric motor. Moreover, this allows the apparatus of the invention to use an inexpensive rotary encoder which has a low resolution.

The desired voltage $V_d$ is added to the thus calculated counter electromotive force E to obtain a modified desired voltage $V_m$. The period of the correction in which the desired voltage $V_d$ is corrected to the modified desired voltage $V_m$ is synchronous with that of the current correction conducted in accordance with the feedback current $I_f$. Accordingly, the control of the correction of the voltage to be applied and the current feedback control can be conducted harmoniously. However, it is not necessary that the two controls are conducted at the same frequency. The period of the control of the correction of the voltage to be applied may be longer than that of the current feedback control.

Further, the three-phase splitting is accomplished using the desired voltage $V_m$ and the rotation phase $\phi$, to calculate desired voltages $V_A$, $V_B$ and $V_C$ for respective phases. The calculated desired voltages are supplied to a PWM circuit 50. In accordance with the desired voltages, the PWM circuit 50 outputs pulse signals for driving gates G1 and G4, G2 and G5, and G3 and G6 of transistors T1 and T4, T2 and T5, and T3 and T6 of the driving circuit 30.

In other words, fundamentally, the instruction value $I_r$ for the driving current is determined on the basis of the detection value of the torque sensor 6 or the like. When a counter electromotive force is generated, the correction takes place so that the driving force is increased while the counter electromotive force E is added to the instruction value $I_r$.

Accordingly, the torque generated by the counter electromotive force can be compensated and an excellent steering sense can be attained.

As described above, in the electric power steering apparatus of the invention, the rotation of an electric motor is controlled so as to compensate a counter electromotive force. Even when the torque is lowered to enter the dead zone where the assistance to the steering force is not required, or when the steering wheel is to be returned, the steering sense is not impaired by the counter electromotive force so that an excellent steering sense is attained.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electric power steering apparatus which detects a steering torque and drives a three-phase brushless direct drive electric motor by applying a voltage corresponding to a driving current instruction value to obtain a steering assistance force, the driving current instruction value being determined in accordance with the detected torque, comprising:

detection means for detecting a number of revolutions of said electric motor;

calculation means for calculating a counter electromotive force of said electric motor on the basis of the number of revolutions of said electric motor detected by said detection means; and correction means for correcting by supplying a voltage to be applied to said electric motor to increase the steering assistance force on the basis of the result of the counter electromotive force calculation of said calculation means.

2. An electric power steering apparatus according to claim 1, wherein said detection means is a rotary encoder.

3. An electric power steering apparatus according to claim 1, wherein said calculation means calculates the counter electromotive force of said electric motor by multiplying the detected number of revolutions of said electric motor by a counter electromotive force constant.

4. An electric power steering apparatus which detects a steering torque and drives a three-phase brushless direct drive electric motor by applying a voltage corresponding to a driving current instruction value to obtain a steering assistance force, the driving current instruction value being determined in accordance with the detected torque, comprising:

first detection means for detecting a driving current of said electric motor;

current control means for converting the driving current detected by said first detection means into a feedback signal;

second detection means for detecting a number of revolutions of said electric motor;

calculation means for calculating a counter electromotive force of said electric motor on the basis of the number of revolutions of said electric motor detected by said second detection means; and correction means for correcting by supplying a voltage to be applied to said electric motor to increase the steering assistance force on the basis of the result of the counter electromotive force calculation of said calculation means;

wherein the period of the detection of the number of revolutions of said electric motor is longer than the period of the feedback signal of said current control means.

5. An electric power steering apparatus according to claim 4, wherein said first detection means is a resistor disposed in a driving circuit for said electric motor.

6. An electric power steering apparatus according to claim 4, wherein said second detection means is a rotary encoder.

7. An electric power steering apparatus according to claim 4, wherein said calculation means calculates the counter electromotive force of said electric motor by multiplying the detected number of revolutions of said electric motor by a counter electromotive force constant.

8. An electric power steering apparatus which detects a steering torque and drives a three-phase brushless direct drive electric motor by applying a voltage corresponding to a driving current instruction value to obtain a steering assistance force, the driving current instruction value being determined in accordance with the detected torque, comprising:

first detection means for detecting a driving current of said electric motor;

current control means for converting the driving current detected by said first detection means into a feedback signal;

second detection means for detecting a number of revolutions of said electric motor;

calculation means for calculating a counter electromotive force of said electric motor on the basis of the number of revolutions of said electric motor detected by said second detection means; and correction means for correcting by supplying a voltage to be applied to said electric motor to increase the steering assistance force on the basis of the result of the counter electromotive force calculation of said calculation means;

wherein the period of the feedback signal of said current control means is synchronized with the period of the voltage applied by said correction means.

9. An electric power steering apparatus according to claim 8, wherein said first detection means is a resistor disposed in a driving circuit for said electric motor.

10. An electric power steering apparatus according to claim 8, wherein said second detection means is a rotary encoder.

11. An electric power steering apparatus according to claim 8, wherein said calculation means conducts the calculation of the counter electromotive force of said electric motor with multiplying the detected number of revolution of said electric motor by a counter electromotive force constant.

* * * * *